(12) United States Patent
Tamasho et al.

(10) Patent No.: US 6,397,981 B1
(45) Date of Patent: Jun. 4, 2002

(54) ELECTROMECHANICAL BRAKE SYSTEM

(75) Inventors: Tadashi Tamasho, Kanagawa; Masahiro Kubota; Masahiro Tsukamoto, both of Yokohama, all of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/661,784

(22) Filed: Sep. 14, 2000

(30) Foreign Application Priority Data

Sep. 14, 1999 (JP) .......................................... 11-260961

(51) Int. Cl.[7] .............................................. F16D 55/02
(52) U.S. Cl. .................. 188/71.9; 303/113.4; 188/72.8; 188/156; 188/162
(58) Field of Search ................................ 303/20, 113.4; 188/71.9, 72.8, 156, 157, 158, 162

(56) References Cited

U.S. PATENT DOCUMENTS

| | | | | |
|---|---|---|---|---|
| 4,623,044 A | * | 11/1986 | Ohta et al. ................... | 188/72.1 |
| 4,809,824 A | * | 3/1989 | Fargier et al. .............. | 188/72.8 |
| 5,090,518 A | * | 2/1992 | Schenk et al. .............. | 188/72.1 |
| 5,161,650 A | * | 11/1992 | Taig ........................... | 188/72.8 |
| 5,319,292 A | * | 6/1994 | Backstrand .................. | 188/156 |
| 5,348,123 A | * | 9/1994 | Takahashi et al. ......... | 188/72.1 |
| 5,645,143 A | * | 7/1997 | Mohr et al. ................. | 188/72.1 |
| 5,988,335 A | | 11/1999 | Kupferschmid et al. | |
| 6,030,054 A | * | 2/2000 | Doericht ..................... | 303/20 |
| 6,089,359 A | * | 7/2000 | Tanaka ........................ | 188/162 |
| 6,105,737 A | * | 8/2000 | Weigert et al. ............. | 188/158 |
| 6,138,801 A | * | 10/2000 | Shirai et al. ................. | 188/157 |
| 6,158,558 A | * | 12/2000 | Bill et al. .................... | 188/162 |
| 6,186,599 B1 | * | 2/2001 | Otomo et al. ................. | 303/20 |
| 6,250,436 B1 | * | 6/2001 | Oikawa et al. ............. | 188/72.1 |

FOREIGN PATENT DOCUMENTS

| | | |
|---|---|---|
| DE | 196 15 186 | 8/1997 |
| DE | 198 07 432 | 12/1998 |
| DE | 197 42 988 | 1/1999 |
| DE | 198 04 454 | 5/1999 |
| JP | 8-284980 | 11/1996 |
| WO | WO 00/29764 | 5/2000 |

* cited by examiner

*Primary Examiner*—Paul N. Dickson
*Assistant Examiner*—Devon Kramer
(74) *Attorney, Agent, or Firm*—McDermott, Will & Emery

(57) ABSTRACT

An electromechanical brake system for a vehicle has a brake actuator installed to each wheel of the vehicle and a controller for controlling an operation of each brake actuator. The brake actuator is constituted to clamp a disc rotor by a pair of brake pads through a rotational motion converting mechanism according to an operation of the motor. The rotational motion converting mechanism is constituted by a screw shaft integrally connected to a rotation shaft of the motor and a ball screw screwed with the screw shaft and integrally connected to one of the pair of brake pads. When the vehicle is put in a stopping state, the controller drives the motor so that an ordinary use region of the screw shaft, which is contacted with balls of the ball nut during a brake operation, is faced with a lubricant hole formed at an end portion of the ball nut.

15 Claims, 8 Drawing Sheets

ELECTROMECHANICAL BRAKE SYSTEM

BACKGROUND OF THE INVENTION

The present invention relates to an electric brake system, and more particularly to an electric brake system which has a rotational motion converting mechanism for converting rotational motion of a motor to linear motion.

Electromechanical brake-by-wire systems (EMB) have been developed in recent years. Japanese Patent Provisional Publication No. 8-284980 discloses a typical EMB which employs a ball screw mechanism for converting rotational motion of a motor into linear motion. The EMB is arranged to linearly move a brake pad by means of the linear motion of the ball screw mechanism and to control braking force through the control of the motion of the brake pad relative to a disc rotor. The ball screw mechanism performs small friction during the conversion from the rotational motion of the motor into the linear motion.

SUMMARY OF THE INVENTION

However, it is difficult to sufficiently lubricate a screw-shaft ordinary use region, which contacts with balls of the ball screw during an ordinary braking operation of the brake system, in order to maintain the small friction performance.

It is therefore an object of the present invention to provide an improved electromechanical brake system which enables oil films to be sufficiently provide oil films on the screw shaft and ensures smooth braking operation.

An electromechanical brake system according to the present invention is for a vehicle and comprises a brake actuator installed to each wheel of the vehicle, a brake pedal sensor for detecting a depression quantity of a brake pedal and a controller connected to the brake actuator and the brake pedal sensor. The brake actuator comprises a motor, a disc rotor integrally connected to each wheel of the vehicle, a pair of brake pads for clamping the disc rotor according to an operation of the motor, and a rotational motion converting mechanism for converting rotational motion of the motor into linear motion to move the brake pad relative to the disc rotor. The controller drives the motor of the brake actuator within a braking operation range so as to generate a braking force according the depression quantity of the brake pedal and drives the motor over the brake operation range to execute a lubricating operation of the rotational motion converting mechanism when the vehicle is put in a stopping state.

DETAILED DESCRIPTION OF THE INVENTION

Referring to FIGS. 1 to 11, there is shown an embodiment of an electromechanical brake system according to the present invention.

Figure 1:
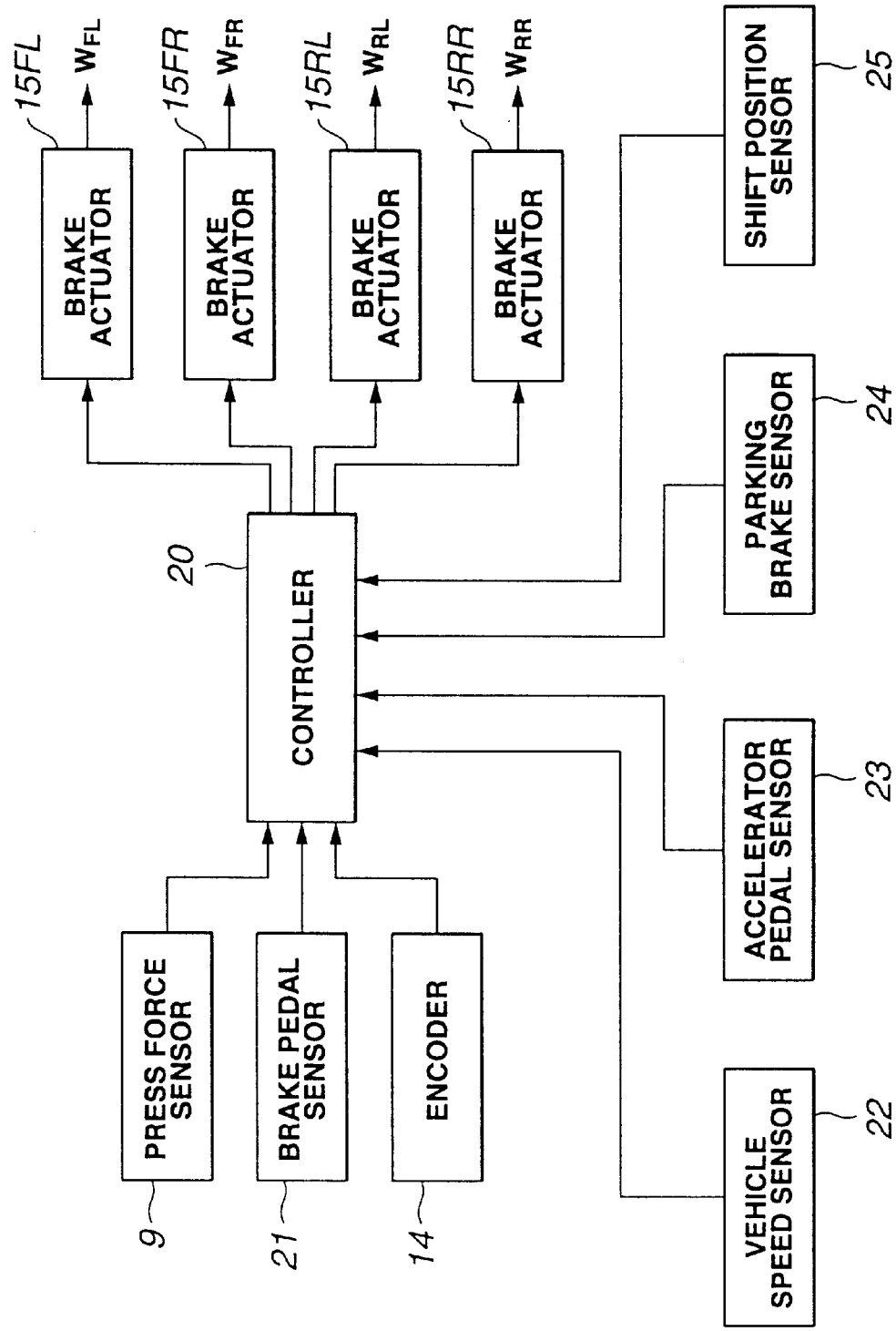
FIG. 1 is a block diagram showing a construction of an electromechanical brake-by-wire system according to the present invention.

FIG. 1 shows a block diagram of the electromechanical brake system installed to a vehicle. The vehicle comprises a front-left wheel $W_{FL}$, a front-right wheel $W_{FR}$, a rear-left wheel $W_{RL}$ and a rear-right wheel $W_{RR}$. The electromechanical brake system is an electromechanical brake-by-wire type and comprises brake actuators 15FL, 15FR, 15RL and 15RR installed to wheels $W_{FL}$, $W_{FR}$, $W_{RL}$ and $W_{RR}$, respectively. Each brake actuator 15FL, 15FR, 15RL, 15RR is arranged to generate a braking force by clamping a disc rotor 7 integrally rotated with each wheel by means of a pair of first and second brake pads 6a and 6b.

Figure 2:
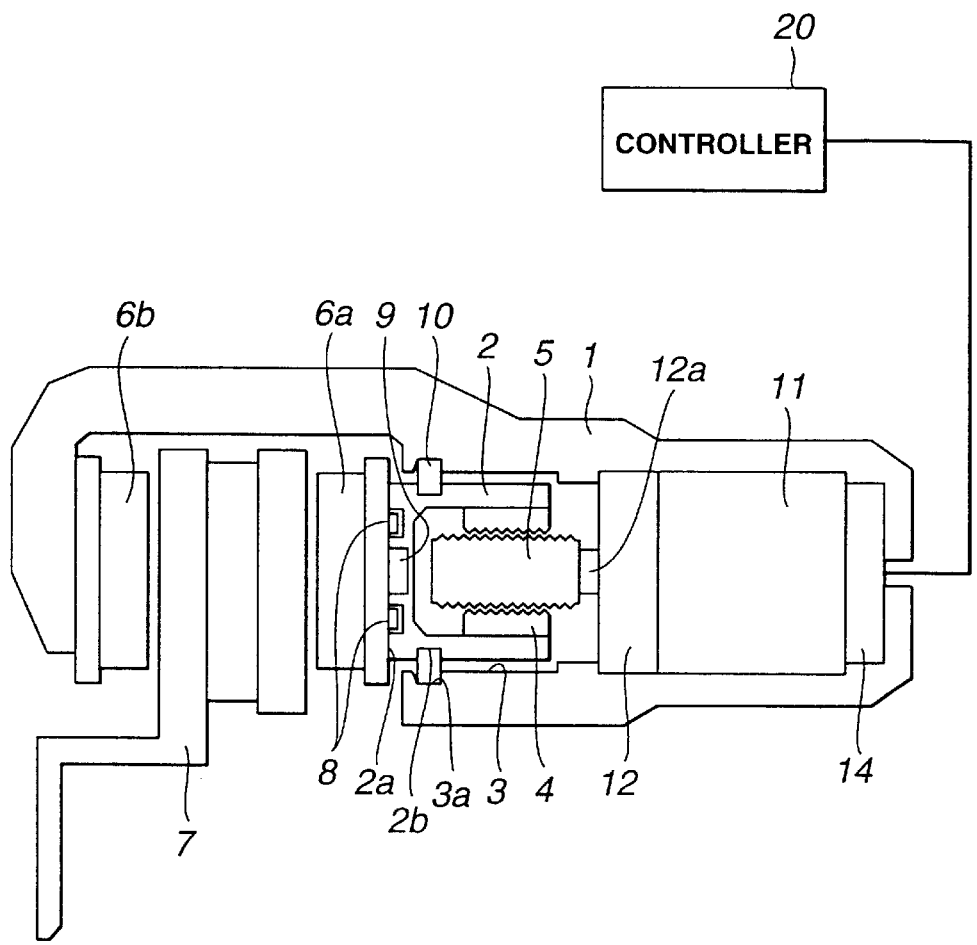
FIG. 2 is a schematic view showing a construction of a brake actuator employed in the system of FIG. 1.

FIG. 2 shows a structure of brake actuators 15FL, 15FR, 15RL and 15RR which are basically the same with each other in structure. As shown in FIG. 2, a floating type caliper 1 has a cylinder 3 which slidably supports a piston 2. Piston 2 is configured into a cylindrical shape whose one end is closed. A ball nut 4 is fixed to an inner periphery of piston 2. A screw shaft 5 is coaxially arranged with a piston 2. Screw shaft 5 is screwed to ball nut 4 and constitutes a ball screw mechanism together with ball nut 4. The ball screw mechanism converts rotational motion of a motor 12 to linear motion and is employed to press first and second brake pads 6a and 6b to a disc rotor 7. First brake pad 6a is installed to an outer periphery of the closed end of piston 2. Second brake pad 6b is disposed opposite to first brake pad 6a with respect to disc rotor 7 and is supported to caliper 1. That is, disc rotor 7 is installed between first and second brake-pads 6a and 6b.

Balls 4c of ball nut 4 receive reaction force relative to a pressing force of first brake pad 6a to disc rotor 7. Therefore, it is necessary that the size of balls 4c is greater than a predetermined size. Further, there is a limitation in decreasing a lead which is defined as an axial movement quantity per one rotation of screw shaft 5 relative to ball nut 4. During an ordinary braking operation, screw shaft 5 rotates small in rotation angle. For example, when the lead of the ball screw mechanism is 4 mm and a movement quantity of first brake pad 6a in the ordinary braking operation is 1 mm, the rotation angle of screw shaft 5 in the ball screw mechanism is around 90 degrees. That is, when the ordinary braking operation is repeatedly executed, the ball screw mechanism repeatedly operates within a limited angle range from 0° to 90°.

Figure 3:
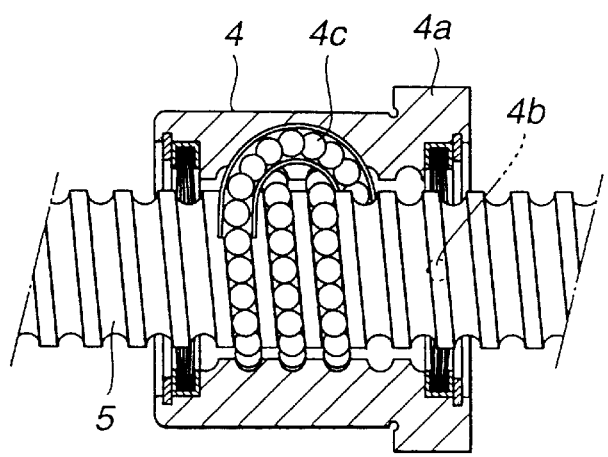
FIG. 3 is a cross-sectional view showing a ball screw mechanism employed in the brake actuator of FIG. 2.

As shown in FIG. 3, a tube embedded type ball nut is employed as ball nut 4 of the ball screw mechanism in this embodiment. An oil hole 4b for supplying lubrication oil to screw shaft 5 is formed at a flange portion 4a of ball nut 4. Although it is preferable to provide an oil hole at a portion between threads of ball nut 4 in view of ordinary lubrication during ordinary braking operation, the pitch of thread of ball nut 4 is too small to provide a required oil hole for sufficiently executing lubrication. Therefore, oil hole 4b is formed at flange portion 4a where no thread is formed. Accordingly, it is necessary to timely move an ordinary use portion of screw shaft 5 at a position facing with oil hole 4b, in order to lubricate the ordinary use portion which is in contact with balls 4c of ball nut 4 during the ordinary braking operation. As mentioned above, screw shaft 5 rotates within the limited angle range from 0° to 90° as far as the ordinary braking is executed, and the balls 4c cyclically (circulatedly) roll at a position apart from flange proton 4a. Therefore, the ordinary use portion of screw shaft 5 is not located at the position facing with the oil hole 4b. That is, the ordinary use portion of screw shaft 5 is not sufficiently lubricated as far as only the ordinary braking operation is executed. Accordingly, there is a possibility that the ball screw mechanism may increase friction in motion between ball nut 4 and screw shaft 5 through balls 4c if the lubrication of the ordinary use portion of screw shaft 5 is not executed at predetermined periods, and therefore the accuracy of the braking operation may be degraded.

In order to solve this problem, it is assumed to set a clearance between first brake pads 6a and disc rotor 7 so as to increase the relative motion between screw shaft 5 and ball nut 4 and to enable the lubrication to be sufficiently executed during the ordinary braking operation. However, the increase of the clearance between first brake pad 6a and disc rotor 7 degrades the responsibility of braking. Therefore, it is difficult to increase the clearance between brake pad and disc rotor. In ordinary setting, the clearance is set at a minimum clearance as far as dragging of brake is not caused during the brake released condition. Further, since brake systems have been generally arranged to control the braking force taking account of wearing of brake pad, the contact region of screw shaft 5 contacted with balls 4c is very slowly and gradually varied according to the wearing of brake pad. However, first brake pad 6a is almost not worn within a few days, and therefore the ball screw mechanism is almost not lubricated as far as the brake system is operated within the ordinary use.

An annular stopper member 8 for preventing the rotation of piston 2 is disposed at an outer surface 2a of piston 2 in contact with first brake pad 6a. Further, pressure sensor 9 of a strain gage is installed to a center portion of outer surface 2a. A first annular groove 2b is formed on a cylindrical outer surface of piston 2 near an end portion of the piston close side. A second annular groove 3b is formed at an inner periphery of cylinder 3 and has a tapered portion opened toward first brake pad 6a. A resilient member 10 is installed to first annular groove 2b and second annular groove 3b as shown in FIG. 2. Therefore, when piston 2 moves toward a direction that first brake pad 6a presses disc rotor 3, resilient member 10 deforms along the tapered portion of second groove 3a so as to produce a biasing force for returning piston 2 to the neutral position.

On the other hand, a motor 11 is a stepping motor or ultrasinic wave motor controller by a controller 20 and is installed to caliper 1. Motor 11 is connected to a reduction gear 12 which reduces an output speed of motor 11. An output shaft 112a of reduction gear 12 connected to screw shaft 5 so that the rotational force of motor 11 is transmitted through reduction gear 12 and output shaft 12a to screw 5 and is converted into the straight motion by means of ball nut 4 and screw shaft 5. As a result, piston 12 moves straight. First brake pads 6a presses rotor 7 according to the linear motion of piston 2, and therefore first and second brake pads 6a and 6b press disc rotor 7. By clamping disc rotor 7 by means of first and second brake pads 6a and 6b, braking force is generated.

As shown in FIG. 1, controller 20 is connected to a brake pedal sensor 21, a vehicle speed sensor 22, a accelerator pedal sensor 23, a parking brake sensor 24, a shift position sensor 25, and pressure sensors 9 and encoders 14 for brake actuators 15FL–15RR, to receive detection signals thereof indicative vehicle operating information. The vehicle operating information includes a braking condition. Brake pedal sensor 21 detects a pressing force applied to a brake pedal by a driver and outputs the detecting signal thereof to controller 20. Brake pedal sensor 21 is constituted by one of a stroke sensor, a magnetostriction sensor and a strain gage. Vehicle speed sensor 22 detects a vehicle speed of the vehicle and outputs the detection signal thereof to controller 20. Accelerator pedal sensor 23 detects whether a accelerator pedal is depressed or not and outputs the detecting signal thereof to controller 20. Parking brake sensor 24 detects whether a parking brake device is in operation or not and outputs the detection signal thereof to controller 20. Shift position sensor 25 detects a selected position of a shift lever of an automatic transmission system and outputs the detection signal indicative of the shift position to controller 20. Pressure sensor 9 is installed to each of brake actuators 15FL–15RR and detects pressure of first brake pad 6a to disc rotor 7. Encoder 14 is installed to each motor 11 and detects the rotation angle of motor 11. Pressure sensor 9 and Encoder 14 also output the detection signals, respectively, to controller 20.

Controller 20 is constituted by a microcomputer acting as a calculation unit and a storage device acting as a storage region of the controller 20. Controller 20 executes a braking control process for the electromechanical brake system according to the present invention as is similar to that of a conventional electromechanical brake system. That is, controller 20 executes the braking control process so that each brake actuator 15FL, 15FR, 15RL, 15RR generates braking force according to the pressing force indicative signal detected by brake pedal sensor 21. Controller 20 drives each motor 11 according to the detection signals of pressure sensor 9 and encoder 14 of each brake actuator 15FL, 15FR, 15RL, 15RR. More specifically, when the braking force is generated, controller 20 drives each motor 11 so that first brake pad 6a is moved toward the press side to press disc rotor 7 by means of first and second brake pads 6a and 6b. When the braking force is decreased, controller 20 drives each motor 11 so that first brake pad 6a is moved toward the release side to release first and second brake pads 6a and 6b from disc rotor 7. That is, by controlling the rotation of motor 11 according to the braking force to be generated, the electromechanical brake system according to the present invention generates braking force according to the depression quantity of the brake pedal.

When the ignition switch is turned on, controller 20 executes the pattern operation process for moving first brake pad 6a of each brake actuator 15FL, 15FR, 15RL, 15RR during the vehicle stopping state, at predetermined time intervals. More specifically, controller 20 sets the operation pattern for moving first brake pad 6a on the basis of the detection signals of accelerator pedal sensor 23, parking brake sensor and shift position sensor 25. Then, controller 20 moves each first brake pad 6a of each brake actuator 15FL, 15FR, 15RL, 15RR according to the set operation pattern.

Figure 4:
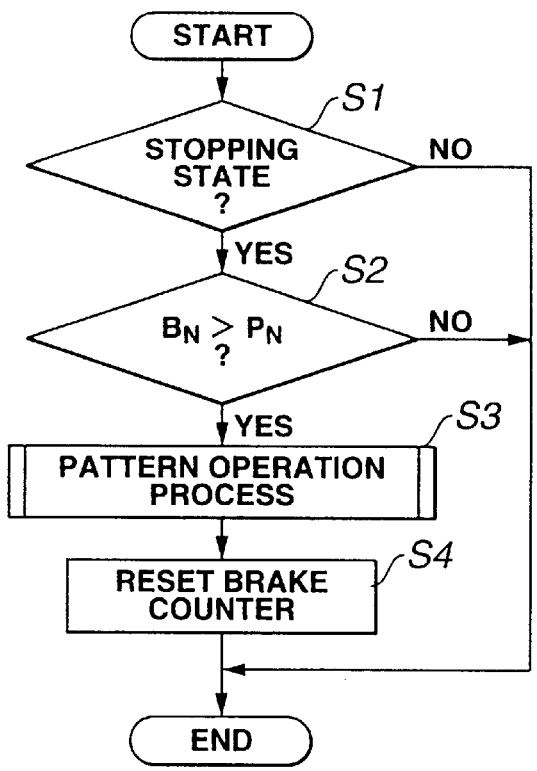
FIG. 4 is a flowchart showing a pattern operation execution control process executed by a controller FIG. 1.
Figure 5:
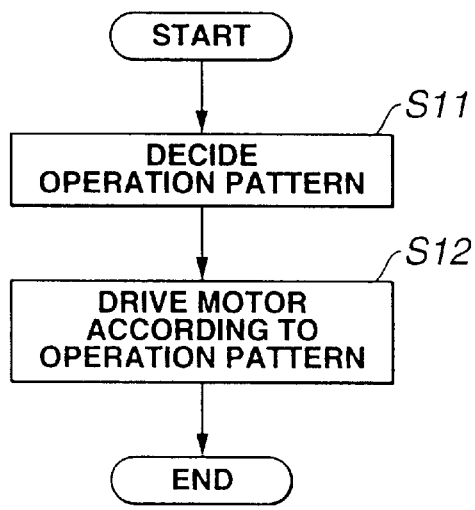
FIG. 5 is a flowchart showing a pattern operation process executed by the controller of FIG. 1.

FIG. 4 is a flowchart showing a pattern operation execution control process for executing the pattern operation process at predetermined time intervals. FIG. 5 is a flowchart showing a procedure of the pattern operation process at step S3 of FIG. 4. The pattern operation process is executed when ignition switch is turned on. Thereafter, the pattern operation execution control process is executed at predetermined interruption timings so that the pattern operation process is executed at predetermined timings.

When the vehicle starts moving during the execution of the pattern operation process, that is, when the detection signal of the vehicle speed sensor 22 is changed from zero during the execution of the pattern operation process, or when the vehicle condition is varied as mentioned later, the pattern operation process is stopped, and first brake pads 6a of brake actuators 15FL–15RR are quickly returned to a condition at the start timing of the pattern operation process.

In the pattern operation execution control process shown in FIG. 4, at step S1, controller 20 decides whether or not the vehicle is in a stopped state. When the decision at step S1 is negative, the present routine is terminated. When the decision at step S1 is affirmative, the routine proceeds to step S2.

At step S2, controller 20 decides whether or not the number $B_N$ of braking operations becomes greater than a predetermined number $P_N$. This number $B_N$ is counted up when the braking control process is executed. When controller 20 decides on the basis of the detection signal of brake pedal sensor 21 that it is necessary to generate braking force and when motor 11 of each brake actuator 15FL, 15FR, 15RL, 15RR starts driving, the number $B_N$ of braking operations is incremented by 1 ($B_N=B_N+1$). This number $B_N$ is stored in a storage region of controller 20. The predetermined number $P_N$ has been previously determined on the basis of the number $B_N$ of braking operations until an oil film at a region of screw shaft 5 contacting with balls of ball nut 4 is dried up.

By the execution of step S2, controller 20 refers the number $B_N$ of braking operations stored in the storage region of controller 20 and decides whether the referred number $B_N$ is greater than the predetermined number $P_N$. When the decision at step S2 is negative, that is, when $B_N \leq P_N$, the routine of this program is terminated and the routine is returned to the main program. When the decision at step S2 is affirmative, the routine proceeds to step S3 wherein the routine of the pattern operation process shown in FIG. 5 is executed.

After the execution of step S3, the routine proceeds to step S4 wherein controller 20 resets a counted value of a counter for counting the number $B_N$ of braking operations and terminates the present routine to return the routine to the main program.

Figure 6:
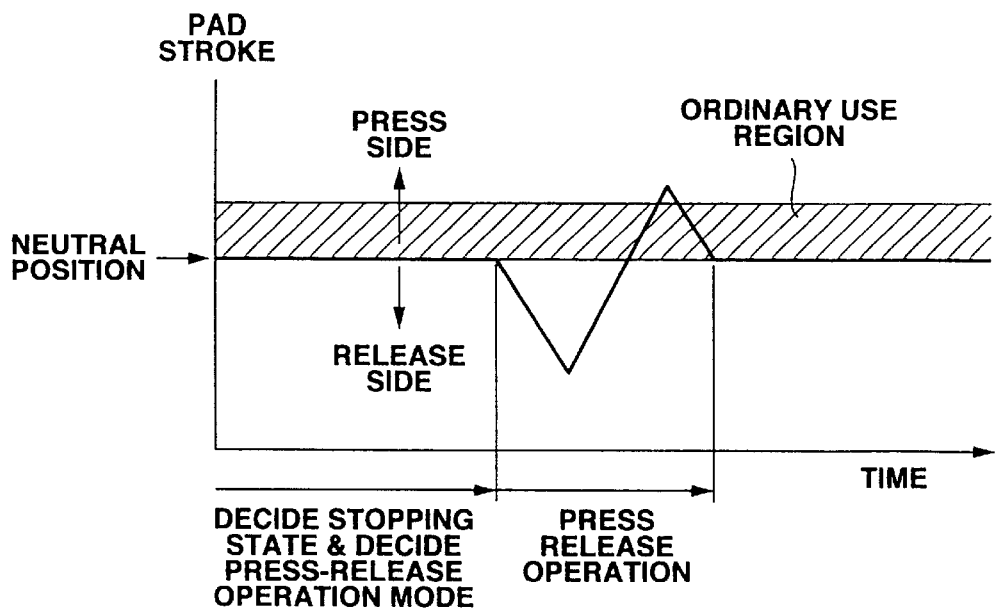
FIG. 6 is a graph showing a lubricating operation executed by the electromechanical brake-by-wire system according to the present invention.

The pattern operation process is executed to move first brake pad 6a as shown in FIG. 6. In FIG. 6, a horizontal axis denotes time, and a vertical axis denotes a pad press stroke representative of a position of first brake pad 6a. Further, a press side indicative that first brake pad 6a is pressed toward disc rotor 7 is a direction toward which a pad press stroke becomes greater than that at a neutral position where first brake pad 6a is positioned during brake inoperative state. A release side indicative that first brake pad 6a is released from disc rotor 7 is a direction toward which a pad press stroke becomes smaller than that at the neutral position. In this Figure, a hatching portion just above the neutral position represents an ordinary use region used in the ordinary braking operation.

When controller 20 decides that the vehicle is in the stopping state, controller 20 moves first brake pad 6a from the neutral position toward the release side by a predetermined release quantity and then moves it to a position over the ordinary operation region. Thereafter, first brake pad 6a is returned to the neutral position. The position apart from the neutral position to the release side by the predetermined release quantity is determined so that this release side movement of the ball screw mechanism sufficiently forms an oil film on the ordinary use region of screw shaft 5.

That is, by moving ball nut 4 relative to screw shaft 5 over the ordinary brake operation region, for example, when ball nut 4 is moved toward the left hand side in FIG. 3, the region of screw shaft 5 corresponding to the ordinary brake operation region is oppositely faced with oil hole 4b so as to be lubricated. In reverse, when ball nut 4 is moved toward the right hand side n FIG. 3, the region of screw shaft 5, which region has been lubricated by the left hand side movement, is contacted with balls 4c of ball nut 4. This operation enables lubrication oil to be supplied to the contact region of screw shaft 5 corresponding to the ordinary brake operation region through balls 4c so as to reproduce oil film between balls 4c and screw shaft 5.

In order to execute the above-mentioned process by each brake actuator 15FL, 15FR, 15RL, 15RR, the procedure shown in FIG. 5 is executed.

At step S11, controller 20 decides an operation pattern of first brake pad 6a on the basis of the detection signals of brake pedal sensor 21, accelerator pedal sensor 23, parking brake sensor 24 and shift position sensor 25 and Table 1. In a case that there is not existed a vehicle condition corresponding either of operation patterns in Table 1, the pattern operation process is terminated.

At step S12, controller 20 drives motors 11 for each brake actuator 15FL, 15FR, 15RL, 15RR to move each first brake pad 6a according to the operation pattern decided at step S11.

Table 1 shows various operation patterns according to vehicle conditions. The vehicle condition includes the shift position selected by a driver through the shift lever, whether or not the parking brake device is operated, whether or not the brake pedal is operated, and whether or not the accelerator pedal is operated.

TABLE 1

| No. | Shift Position | PKB | Brake Operation | Accel. Operation | Operation Pattern | Operation Content |
|---|---|---|---|---|---|---|
| 1 | P | OFF | OFF | OFF or ON | ① | Brake is freely pressed and released since vehicle stopping state is ensured by means except for brake. |
| 2 | P | OFF | ON | OFF or ON | ② | Brake is pressed and released as far as it is greater than total braking force according to the brake operation input. |
| 3 | P | ON | OFF | OFF or ON | ① | When PKB braking force is commonly used, braking force of PKB is added to total braking force. |
| 4 | P | ON | ON | OFF or ON | ② | |

TABLE 1-continued

| No. | Shift Position | PKB | Brake Operation | Accel. Operation | Operation Pattern | Operation Content |
|---|---|---|---|---|---|---|
| 5 | D | OFF | OFF | OFF | ① | Vehicle is stopped on up-slope due to driving force. |
| 6 | D | OFF | ON | OFF | ③ | As to drive wheel pressing is permitted. In a case of releasing, pressing is permitted during racing start. |
| 7 | D | ON | OFF | OFF | ① | When PKB braking force is commonly used, braking |
| 8 | D | ON | ON | OFF | ③ | force of PKB is added to total braking force. |
| 9 | N | OFF | OFF | OFF or ON | ① | Vehicle is stopped due to friction. |
| 10 | N | OFF | ON | OFF or ON | ② | |
| 11 | N | ON | OFF | OFF or ON | ① | When PKB braking force is commonly used, braking |
| 12 | N | ON | ON | OFF or ON | ② | force of PKB is added to total braking force. |

*REMARKS:
(1) Shift Position
—P: Driving force is not transmitted, and drive shaft is mechanically locked.
D: Driving force is transmitted.
N: Driving force is not transmitted. Driving shaft is not locked.
(2) PKB—Parking Brake
(3) OFF: There is no operation input. ON: There is an operation input.

In Table 1, the vehicle condition No. 1 indicates that the shift position is set at a parking position (P), the parking brake PKB is set at OFF state, braking operation is set at OFF state, accelerating operation may be set at OFF or ON state. That is, brake actuators 15FL–15RR do not generate braking force. Under this vehicle condition No. 1, the vehicle stopping condition is ensured without employing the braking force of brake actuators 15FL–15RR. That is, it is decided that brake actuators 15FL–15RR may be freely controlled. Therefore, the operation pattern ① is selected regardless the operating condition of the accelerator pedal.

In a case of this operation pattern ①, in order to quick reproduce oil films, first brake pads 6a of brake actuators 15FL–15RR are simultaneously moved toward the release side by the predetermined quantity and then returned to the neutral position. Thereafter, first brake pad 6a for front-right wheel $W_{FL}$ is moved toward the press side by the predetermined press quantity and is then returned to the neutral position. Next, first brake pad 6a for front-left wheel $W_{FR}$ is moved toward the press side by the predetermined press quantity and is then returned to the neutral position. Similarly, first brake pad 6a for rear-right wheel $W_{RL}$ and that for rear-left wheel $W_{RR}$ are sequentially moved and returned one by one. This one by one operation is executed in order to prevent the brake system from temporally and concentratedly consuming electric power for this lubricating operation since the simultaneous operation of four first brake pads 6a for all wheels $W_{FL}$, $W_{FR}$, $W_{RL}$ and $W_{RR}$ toward the press side requires large quantity of electric power.

Although this embodiment has been arranged to sequentially execute the lubricating operation from front-left wheel $W_{FL}$, it will be understood that the present invention is not limited to this and may be arranged to execute this lubricating operation in other way. Taking account of a condition that the pattern operation process is stopped when the vehicle starts running or when the vehicle condition is varied, it is preferable that the lubricating operation is executed from the driving wheels sequentially.

Under the vehicle condition No. 2 where the braking operation is executed under the vehicle condition No. 1 to generate braking force through braking actuators 15FL–15RR, controller 20 controls brake actuators 15FL–15RR by selecting the operation pattern ② so as to maintain the total braking force generated by the brake actuators 15FL–15RR according to the depression quantity of the brake pedal in order to maintain the stopping state of the vehicle.

Figure 8:
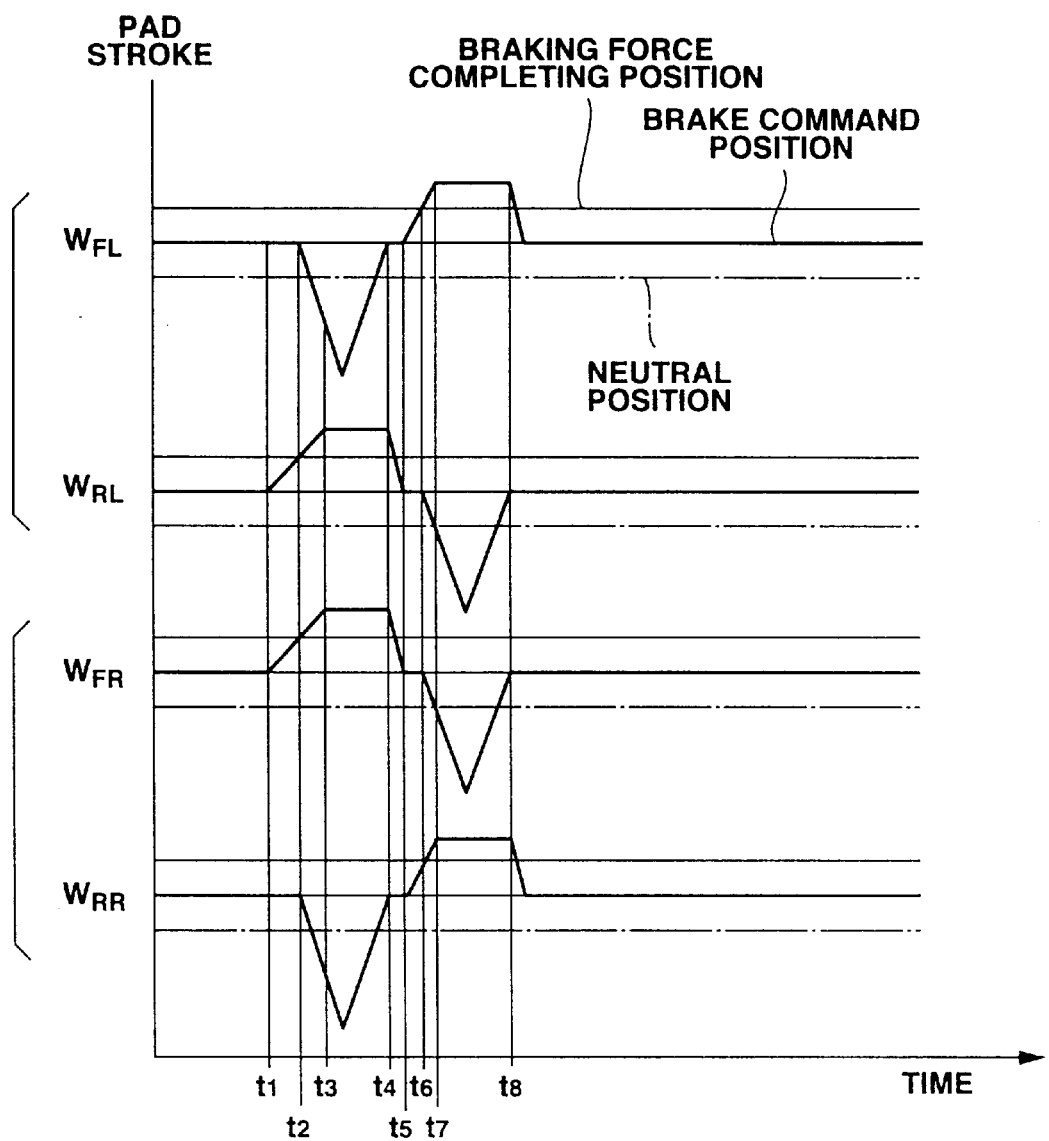
FIG. 8 is time chart showing the operation of the operation pattern ②.

In the operation pattern ②, in order to maintain the total braking force according to the depression quantity of the brake pedal, four wheels $W_{FL}$, $W_{FR}$, $W_{RL}$ and $W_{RR}$ are grouped into two pairs, as shown in FIG. 8 and each pair of wheels are controlled so that when one wheel of each pair is controlled to decrease the braking force by moving first brake pad 6a toward the release side by the predetermined quantity, the other wheel of each pair is controlled to increase the braking force by moving first brake pad 6a toward the press side. Therefore, two brake actuators 15FL and 15RL, or 15FR and 15RR generate the necessary braking force by each pair of wheels.

Herein, even when the total braking force required is ensured, there is an inadequate condition in that the stopping state of the vehicle is not maintained in some cases. For example, when the vehicle is stopped on an up-slope by generating the required braking force only at front-right and rear-right wheels $W_{FR}$ and $W_{RR}$ without generating at front-left and rear-left wheels $W_{FL}$ and $W_{RL}$, the stopping state of the vehicle is not maintained. In order to solve this problem, front-left wheel $W_{FL}$ and rear-left wheel $W_{RL}$ are unitized, and front-right wheel and rear-right wheel are unitized so that the braking force for the left side is ensured by the left side wheels and the brake force for the right side is ensured by the right side wheels.

As shown in FIG. 8, each first brake pad 6a of each brake actuator 15FL, 15FR, 15RL, 15RR is controlled. In detail, under the condition that each first brake pad 6a is set at a brake command position corresponding to the depression quantity of the brake pedal, the following operations are executed.

At a moment $t_1$, brake actuator 15RL of rear-left wheel $W_{RL}$ is controlled to move first brake pad 6a toward the press side so as to increase the braking force generated at brake actuator 15RL.

At a moment $t_2$ when first brake pad 6a of rear-left wheel $W_{RL}$ moves over a braking force completing position, it is decided that the braking force of rear-left wheel $W_{RL}$ ensures the braking force of front-left wheel $W_{FR}$. Therefore, first brake pad 6a of brake actuator 15FL is moved toward the release side by controlling brake actuator 15FL of front-left wheel $W_{FL}$. Then, first brake pad 6a of brake actuator 15FL is returned to the brake command position of the press side after it is moved to a position over the neutral position by a predetermined quantity. At a moment $t_3$, first brake pad 6a of rear-left wheel $W_{RL}$ is stopped, and at a moment $t_4$, first brake pad 6a of front-left wheel $W_{FL}$ is returned to the brake command position. When the braking force of front-left wheel $W_{FR}$ becomes ensured by front-left wheel $W_{FR}$ itself, first brake pad 6a of rear-left wheel $W_{RL}$ is moved toward the release side.

At a moment $t_5$, first brake pad 6a of rear-left wheel $W_{RL}$ is returned to the brake command position. Then, first brake pad 6a of front left wheel $W_{FL}$ is moved toward the press side. Then, when first brake pad 6a of front-left wheel $W_{FL}$ is moved toward the press side over the braking force add position at a moment $t_6$, it is decided that the braking force for rear-left wheel $W_{RL}$ is ensured by that of front-left wheel $W_{FL}$, and therefore first brake pad 6a of rear-left wheel $W_{RL}$ is moved toward the release side. Then, after first brake pad 6a of rear-left wheel $W_{RL}$ reaches a position offset toward the release position by a predetermine quantity, it is returned to the brake command position.

During this period, at a moment $t_7$ when first brake pad 6a of rear-left wheel $W_{RL}$ is moved toward the release side over the neutral position, first brake pad 6a of front-rear wheel $W_{FL}$ is stopped moving to ensure the total braking force of the left wheel side only by front-left wheel $W_{FL}$.

At a moment $t_8$, first brake pad 6a of rear-left wheel $W_{RL}$ is returned to the brake command position, and first brake pad 6a of front-left wheel $W_{FR}$ is also returned to the brake command position.

The braking force completing position is set a position where the total braking force to be generated by front-left wheel $W_{FL}$ and rear-left wheel $W_{RL}$ is ensured by only one of front-left wheel $W_{FL}$ and rear-left wheel $W_{RL}$. For example, the brake force completing position is set based on the depression quantity of the brake pedal. The stop position, in the case that first brake pad 6a moved toward press side for ensuring the total braking force is stopped, is set at a position which is over the braking force completing position and over the ordinary use region.

As similar to the left wheel set, the right wheel set are also controlled as shown in FIG. 8. Since the left wheel set is controlled to first move front-left wheel $W_{FR}$ toward the release side, rear-right wheel $W_{RR}$ in the right wheel set is first moved to the release side, in order to prevent both front wheels $W_{FL}$ and $W_{FR}$ from being put in the release state (non-braking state). Although the operation shown in FIG. 8 is arranged to execute the lubricating operation of the left wheel set and the right wheel set in parallel, it will be understood that they may be executed in sequence.

Under the vehicle condition No. 3 where the parking brake device is in operation in addition to the vehicle condition No. 1, the operation pattern ①is selected. Further, under this vehicle condition No. 3, when brake actuators 15FL–15RR and the parking brake device are independently constituted and operated, the pattern operation process is executed as is the same as that in the vehicle condition No. 1. When the parking brake device and brake actuators 15FL–15RR are not independent with each other, when the parking brake device is in operation and when each brake actuator 15FL, 15FR, 15RL, 15RR is operated, the braking force completing position is determined taking account of the braking force generated by each brake actuator 15FL, 15FR, 15RL, 15RR according to the operation of the parking brake device.

Similarly, under the vehicle condition No. 4 in that the parking brake device is in operation in addition to the condition No. 2, the operation pattern ②is selected. In this case, the parking brake device and brake actuator 15FL, 15FR, 15RL, 15RR are independently constructed and operated. When the operation of the parking brake device is independent of that of each brake actuator 15FL, 15FR, 15RL, 15RR, the pattern operation process is executed as is the same as that in the vehicle condition No. 2. When the operation of the parking brake device and brake actuator are not independent with each other, the braking force completing position is set taking account of the braking force generated by each brake actuator 15FL, 15FR, 15RL, 15RR according to the operation of the parking brake device.

Next, under the vehicle condition No. 5 in that the shift position is selected at "D" where the driving force is transmitted, when the parking brake device is not in operation, when the brake pedal is not depressed, and when the accelerator pedal is not depressed (not in operation), for example, when the vehicle is stopping on an up-slope by generating the driving force (creep phenomenon), it is possible to freely control brake actuator 15FL, 15FR, 15RL, 15RR. Therefore, the operation pattern ①is selected.

Next, under the vehicle condition No. 6 in that the brake pedal is depressed (in operation) in addition to the vehicle condition No. 5, the driving force is transmitted to the driving wheels and the vehicle is stopping by the braking operation. Therefore, there is a possibility that the driving wheels start racing by inadvertent release of first brake pads 6a of the driving wheels. Therefore, in order to avoid brake pads 6a of the driving wheels moved to the release side, the operation pattern ③is selected.

Figure 9:
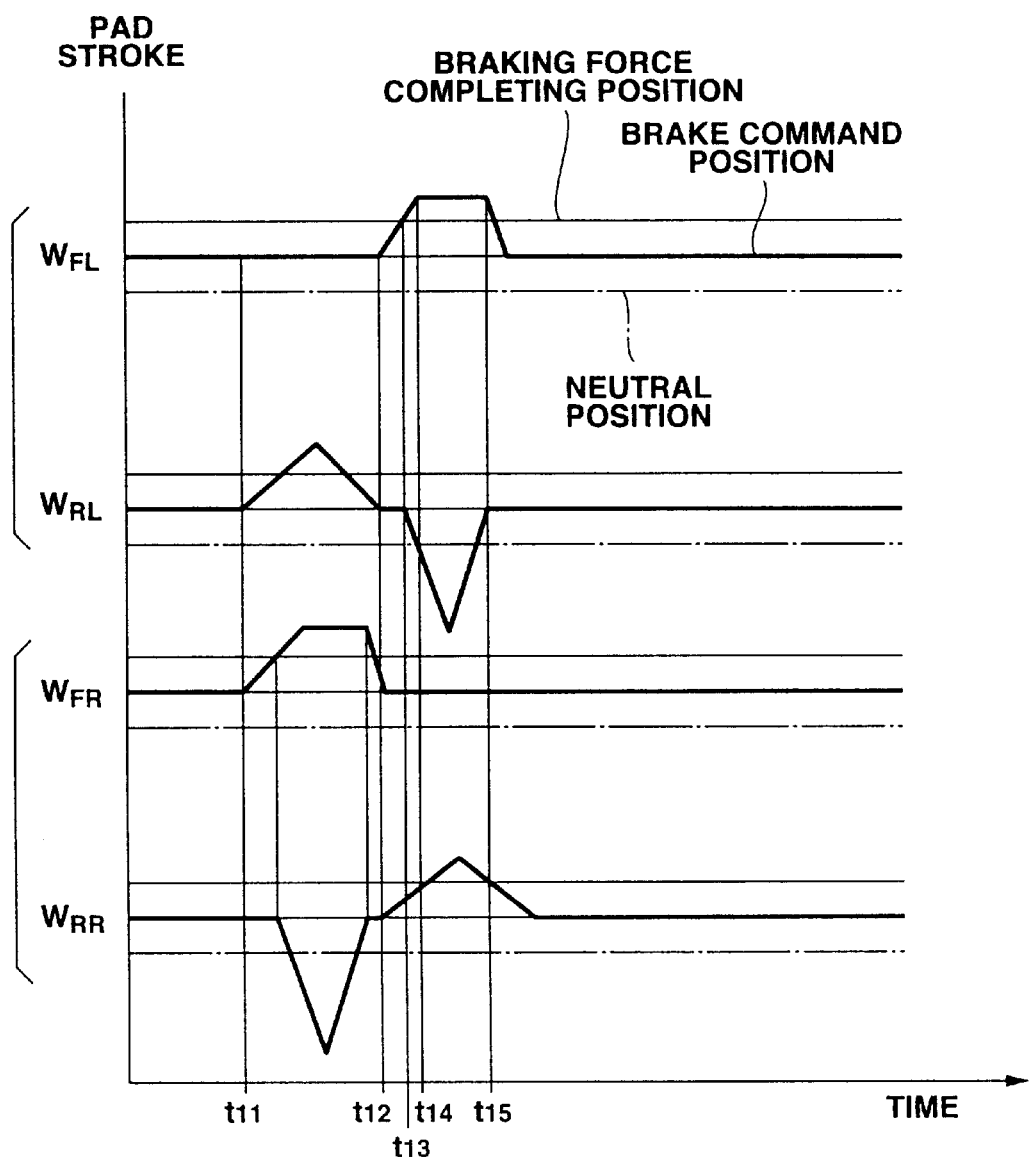
FIG. 9 is a time chart showing the operation of the operation a pattern ③.

In the operation pattern ③, as shown in FIG. 9, four wheels are grouped into the left wheel set including wheels $W_{FL}$ and $W_{RL}$,and the right wheel set including wheels $W_{FR}$ and $W_{RR}$, and the control according to the present invention is executed by each wheel set as is similar to the operation pattern ②. In the case of a front-wheel drive vehicle, first brake pads 6a of front-left wheel $W_{FL}$ and rear-left wheel $W_{RL}$ are set at the brake command position, and at a moment $t_{11}$ first brake pad 6a of rear-left wheel $W_{RL}$ is moved to the press side and further moved to the position over the ordinary use region by a predetermined quantity. Thereafter, it is returned to the brake command position. At a moment $t_{12}$ when first brake pad 6a of rear-left wheel $W_{RL}$ is returned to the brake command position, first brake pad 6a of front-left wheel $W_{RL}$ acting as driving wheel is moved toward the press side. At a moment $t_{13}$ when first brake pad 6a of front-left wheel $W_{RL}$ is moved over the braking force completing position where front-left wheel $W_{FL}$ generates the braking force corresponding to the total braking force required to front-left wheel $W_{FL}$ and rear-left wheel $W_{RL}$, first brake pad 6a of rear-left wheel $W_{RL}$ is moved toward the release side. After first brake pad 6a of rear-left wheel $W_{RL}$ is moved over the neutral position by the predetermined quantity, it is returned to the brake command position. At a moment $t_{14}$ when first brake pad 6a of rear-left wheel $W_{RL}$ is moved over the neutral position, first brake pad 6a of front-left wheel $W_{FL}$ is stopped to ensure the total braking force for the left wheel set. At a moment $t_{15}$ when first brake pad 6a of rear-left wheel $W_{RL}$ is returned to the brake command position, first brake pad 6a of front-left wheel $W_{FL}$ is returned to the brake command position.

Similar operation is executed as to the right wheel set. Since first brake pad 6a of rear-left wheel $W_{RL}$ is first moved to the press side in the left wheel set, first brake pad 6a of front-right wheel $W_{FR}$ is first moved to the press side in the right wheel set, and first brake pad 6a of front right wheel $W_{FR}$ acting as driving wheel is not moved to release side.

Next, under the vehicle condition No. 7 in that the parking brake device is in operation under the vehicle condition No.

5, the operation pattern ①is selected. Under this condition, if the parking brake device operates independently of brake actuators 15FL, 15FR, 15RL, 15RR, the pattern operation process is executed as is similar to that of the vehicle condition No. 5. If the parking brake device and brake actuators 15FL, 15FR, 15RL, 15RR are not independent of each other, the braking force completing position is determined taking account of operating condition of the parking brake device.

On the other hand, under the vehicle condition No. 8 in that the parking brake device is in operation under the vehicle condition No. 6, it is necessary to avoid brake pads 6a from being moved to the release side, in order to avoid driving wheels. Therefore, as is similar to the vehicle condition No. 6, the operation pattern ③is selected. Under this condition, if the parking brake device operates independently of brake actuators 15FL, 15FR, 15RL, 15RR, the pattern operation process is executed as is similar to that of the vehicle condition No. 6. If the parking brake device and brake actuators 15FL, 15FR, 15RL, 15RR are not independent with each other, the braking force completing position is determined taking account of operating condition of the parking brake device.

When the shift position is set at "D" as shown in the vehicle conditions Nos. 5–8 and when the brake pedal is in operation, it is necessary to cancel the pressing operation of first brake pad 6a during the increase of the depression quantity of the accelerator pedal. However, if the decision that the depression quantity of the accelerator pedal is increased is delayed, there is a possibility that the vehicle radically starts running. Therefore, only when the accelerator pedal is not depressed, first brake pad 6a is moved.

Next, under the vehicle condition No. 9 in that the shift position is set at "N", that is, under the condition that the driving force is not transmitted, the drive shaft is mechanically unlocked, the parking brake device is not in operation, the brake pedal is not in operation, and the accelerator pedal is not in operation, consequently, under the condition that the vehicle is stopping due the friction, brake actuators 15FL–15RR can be freely controlled. Therefore, the operation pattern ①is selected.

Under the vehicle condition No. 10, in that the brake pedal is in operation under the vehicle condition No. 9, it is necessary to ensure the braking force corresponding to the depression quantity of the brake pedal. Therefore, the operation pattern ②is selected. When the parking brake device operates independently of brake actuators 15FL, 15FR, 15RL, 15RR, the pattern operation process is executed as is similar to that under the vehicle condition No. 9. When the parking brake device and brake actuators 15FL, 15FR, 15RL, 15RR are not independent with each other, the braking force completing position is determined taking account of the operating condition of the parking brake device.

Under the vehicle condition No. 12 in that the brake pedal is in operation under the vehicle condition No. 11, it is necessary to ensure the braking force corresponding to the depression quantity of the brake pedal. Therefore, the operation pattern ②is selected. When the parking brake device operates independently of brake actuators 15FL, 15FR, 15RL, 15RR, the pattern operation process is executed as is similar to that under the vehicle condition No. 10. When the parking brake device and brake actuators 15FL, 15FR, 15RL, 15RR are not independent with each other, the braking force completing position is determined taking account of the operating condition of the parking brake device.

Herein, disc rotor 7 and brake pads 6a and 6b correspond to a braking force generating means. Brake pedal sensor 21 corresponds to a pedal depression quantity detecting means. Controller 20 corresponds to a braking force control means. The process of step S1 in FIG. 3 corresponds to a stopping state detecting means. The process shown in FIG. 5 corresponds to an outer region moving means. Brake pedal sensor 21, accelerator pedal sensor 23, parking brake sensor 24 and shift position sensor 25 correspond to a vehicle operating condition detecting means.

Next, the manner of operation of the electromechanical brake system according to the present invention will be discussed.

When the ignition switch is turned on, the pattern operation process shown in FIG. 5 is executed. Controller 20 decides the operation pattern on the basis of the vehicle condition by executing step S11 of FIG. 5. More specifically, controller 20 detects the shift position and whether or not the parking brake device, the brake pedal, and the accelerator pedal are in operation, on the basis of the detection signals outputted from shift position sensor 25, parking brake sensor 24, brake pedal sensor 21 and accelerator pedal sensor 23. Further, controller 20 decides the operation pattern on the basis of the detected vehicle condition.

For example, when the shift position is "P", when the parking brake device is in operation, and when the brake pedal and the accelerator pedal are not in operation, controller 20 decides that the vehicle condition corresponds to No. 3 in Table 1, and therefore controller 20 selects the operation pattern ①.

Figure 7:
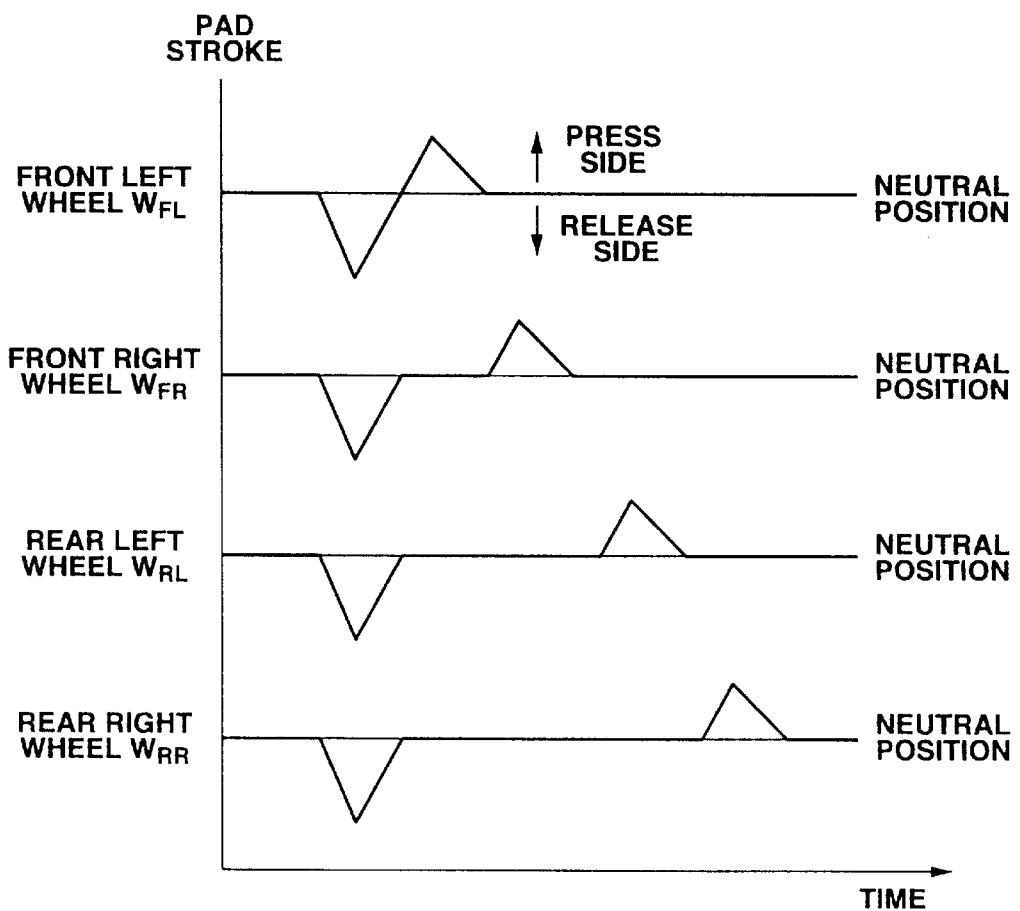
FIG. 7 is a time chart showing the operation of the operation pattern ①.

Thereafter, controller 20 controls each motor 11 to move each first brake pad 6a of each brake actuator 15FL, 15FR, 15RL, 15RR by executing step S12 of FIG. 5. That is, first brake pad 6a of each wheel $W_{FL}$, $W_{FR}$, $W_{RL}$, $W_{RR}$ is simultaneously moved from the neutral position toward the release side shifted by a predetermined quantity and is returned to the neutral position. Thereafter, in the order of front-left wheel $W_{FL}$, front-right wheel $W_{FR}$, rear-left wheel $W_{RL}$ and rear-right wheel $W_{RR}$, one by one, first brake pad 6a of each wheel is moved toward the press side by a predetermined quantity and is returned to the neutral position, as shown in FIG. 7.

With this operation, first brake pad 6a is moved so that the oil film is sufficiently formed on the region of screw shaft 5 which region is contacted with balls 4c of ball nut 4 during the ordinary braking operation. Further, when first brake pad 6a is moved to the release side, brake pads 6a of four wheels $W_{RL}$–$W_{RR}$ are simultaneously moved. Therefore, by the movements of screw shafts 5 toward the release side, oil films are produced on the ordinary use regions of respective screw shafts 5. Accordingly, when the vehicle starts running, although the pattern operation process is stopped, the lubrication shortage is avoided since the oil film has been already formed on screw shaft 5.

After the pattern operation process executed according to the turning on of the ignition switch is terminated, when the vehicle starts running and when a driver depresses the brake pedal, each motor 11 of brake actuator 15FL, 15FR, 15RL, 15RR is drive-controlled on the basis of the detection signals of pressure sensor 9 and encoder 14 so as to generate braking force corresponding to the detection signal of brake pedal sensor 21 according to the brake control process. As a result, the press force of first and second brake pads 6a to disc rotor 7 is controlled to generate the braking force according to the depression quantity of the brake pedal. The counter is counted up by each depression of the brake pedal to count the number $B_N$ of braking operations.

During this period, the pattern operation execution control process shown in FIG. 4 is executed by predetermined interruption timings. That is, controller 20 monitors whether the vehicle is in the stopping state by the execution of step S1. When the vehicle is in the stopping state, controller 20 decides whether the content of the counter set by the brake control process is greater than the predetermined number $P_N$ by the execution of step S2. When the number $B_N$ of the braking operations is smaller than or equal to the predetermined number $P_N$, the routine is terminated. When the number $B_N$ of the braking operations is greater than the predetermined number $P_N$, the pattern operation process is executed by the execution of step S3.

Then, controller 20 decides the operation pattern from Table 1 on the basis of the operating conditions of the shift position, the parking braking device and the brake pedal. Further, controller 20 moves each brake pad 6ta of each brake actuator 15FL, 15FR, 15RL, 15RR according to the decided operation pattern.

For example, when the shift position is "D", when the brake pedal is depressed, and when the parking brake device and the accelerator pedal are not in operation, the operation pattern ③ is selected from Table 1 by the execution of step S11. The operation patter ③ is executed as shown in FIG. 9. First, first brake pad 6a of rear-left wheel $W_{RL}$ is moved from the brake command position to the press side by a predetermined quantity and is returned to the brake command position where the braking force corresponding the depression quantity of brake pedal can be generated. Further, first brake pad 6a of rear-left wheel $W_{RL}$ is moved to the position of the release side apart from the neutral position by the predetermined quantity, and is returned to the brake command position. Thereafter, first brake pad 6a of front-left wheel $W_{FL}$ is moved toward the press side, and is moved at the braking force completing position where the braking force to be generated by both of front-left wheel $W_{FL}$ and rear-left wheel $W_{RL}$ is generated only by the front left front-left wheel $W_{FL}$. Simultaneously, first brake pad 6a of rear-left wheel $W_{RL}$ is moved to the release side. Further, after first brake pad 6a of rear-left wheel $W_{RL}$ reaches the position of the release side apart from the neutral position by the predetermined quantity, it is returned to the brake command position. Thereafter, first brake pad 6a of rear-left wheel $W_{FL}$ is returned to the brake command position. As is similar to the operation of the left wheel set, the right wheel set of front-right wheel $W_{FR}$ and rear-right wheel $W_{RR}$ is controlled as mentioned above.

When the pattern operation process is being executed and when the vehicle condition is changed, that is, when the condition of at least one of the shift position, the parking brake device, the brake pedal and the accelerator pedal is changed, the pattern operation process is stopped and first brake pad 6a of each brake actuator 15FL, 15FR, 15RL, 15RR is returned to the neutral position. For example, when the vehicle starts running according to the operation of the shift lever, first brake pads 6a are returned to the neutral position at the moment when the shift lever is operated. Therefore, brake pads 6a are positioned at the neutral position without being offset to the press side or the release side at the time of the vehicle start. This enables the brake system to quickly operate according to the change of the vehicle condition.

Further, when first brake pad 6a of rear-left wheel $W_{RL}$ is moved to the release side, first brake pad 6a of front-left wheel $W_{FL}$ is moved to a position where brake pads 6a and 6b clamp disc rotor 7 to generate a braking force corresponding to the total braking force required to the left wheel set. Therefore, even when first brake pad 6a of the rear-left wheel $W_{RL}$ is moved to the release side, the stopping state of the vehicle is maintained. Similarly, the right wheel set are also controlled to ensure the braking force required to the right wheel set. This arrangement enables the vehicle to be stopped on an up-slope even when the lubricating operation is executed.

Further, as to driving wheels, brake pads 6a thereof are moved only toward the press side. Therefore, the driving wheels are prevented from starting racing (caused by the inadvertent release of brake pads 6a of the driving wheels).

Under the above-mentioned condition, rear-left wheel $W_{RL}$ and rear-right wheel $W_{RR}$ are moved to the release side by the predetermined quantity from the neutral position. Therefore, oil films are reproduced on the ordinary use regions of respective screw shafts 5.

As far as the ordinary braking operation is executed, only the ordinary use region of screw shaft 5 is contacted with balls 4c of ball nut 4. This may prevent oil films from being produced between screw shaft 5 and balls 4c so as to increase friction therebetween. However, by moving rear-left wheel $W_{RL}$ and rear-right wheel $W_{RR}$ toward the release side apart from the neutral position by the predetermined quantity, oil film is formed on the ordinary use region of screw shaft 5. Therefore, the friction between screw shaft 5 and ball 4c of ball nut 4 is maintained at an initial friction value.

After the pattern operation process is terminated, the count value indicative of the number $B_N$ of braking operations, which is stored in a predetermined storage region of controller 20, is reset. Until this count value reaches the predetermined number $P_N$, the pattern operation process is not executed. Thereafter, when the vehicle is put in the stopping state (step S1) and when the number $B_N$ of braking operations becomes greater than the predetermined number $P_N$ (step S2), the pattern operation process is executed.

For example, when the shift position is in "N", when the parking brake device is not in operation, and when the brake pedal is depressed (in operation), controller 20 decides that the operation pattern of the vehicle is ② in Table 1 by executing step S11 in FIG. 5. Further, controller 5 drives motor 11 of each brake actuator 15FL, 15FR, 15RL, 15RR on the basis of the decided operation pattern ② by executing step S12.

That is, as shown in FIG. 8, by moving first brake pad 6a of rear-left wheel $W_{RL}$ toward the press side and at the braking force completing position where the braking force of rear-left wheel $W_{RL}$ becomes equal to the braking force required to front-left wheel $W_{FL}$ and rear-left wheel $W_{RL}$. Simultaneously, first brake pad 6a of front-left wheel $W_{FL}$ is moved to the release side apart from the neutral position by the predetermined quantity, and is then returned to the brake command position. Thereafter, first brake pad 6a of front-left wheel $W_{FL}$ is moved at the position over the braking force completing position in the press side, and first brake pad 6a of rear-left wheel $W_{RL}$ is then returned to the release side position apart from the neutral position by the predetermined quantity. Then, they are returned to the brake command position. Simultaneously, as to the right wheel set, similar operation is executed.

When first brake pad 6a of one wheel of a wheel set is moved toward the release side, first brake pad 6a of the other wheel of the wheel set is moved toward the press side and at the braking force completing position where the braking force to be generated by the wheel set is generated only by the other wheel. Therefore, even when the first brake pad 6a of the one wheel of each wheel set is moved to the release side, the stopping state of the vehicle is maintained.

Further, since brake pads 6a of rear-left wheel $W_{RL}$ and rear-right wheel $W_{RR}$ are moved to the release side apart from the neutral position by the predetermined quantity, oil film is formed on the ordinary use region of each screw shaft 5.

When the number $B_N$ of braking operations reaches the predetermined number $P_N$ and when the vehicle is in the stopping state, first brake pads 6a of all wheels $W_{FL}$, $W_{FR}$, $W_{RL}$ and $W_{RR}$ are moved to the release side apart from the neutral position by the predetermined quantity. Therefore, even if the braking operation is executed only within the ordinary use region so that the lubrication of the ball screw mechanism cannot be sufficiently executed, lubrication oil is supplied to the ordinary use region of screw shaft 5 by the controlled release side movements according to the present invention. This enables oil films to be reproduced on the ordinary use regions of screw shafts 5. Therefore, the increase of friction due to the insufficient lubrication is prevented. For example, this lubricating operation according to the present invention solves a problem that the operational characteristic of the ball screw mechanism is varied according to the increase of friction therein so that actual operation of first brake pad 6a becomes different from the commanded operation so as to generate the difference between the aimed braking force and the actual braking force. Further, this arrangement solves a problem that required electric power is increased due to the difference between the aimed braking force and the actual braking force. Therefore, the brake system according to the present invention maintains stable braking performance.

Even if the parking brake device and brake actuators are shared in use (are not independent with each other), controller 20 executes the pattern operation process upon taking account of this share use circumstance. Therefore, the stopping state of the vehicle is firmly maintained.

Further, it is possible to update a brake model stored in controller 20 by detecting the movement of first brake pads 6a according to the drive signal to motors 11 on the basis of the detection signals of pressure sensors 9 and encoders 14 when the pattern operation process is executed. Therefore, it is possible to calculate the input command corresponding to a desired output under the most certain condition at this period.

Figure 10:
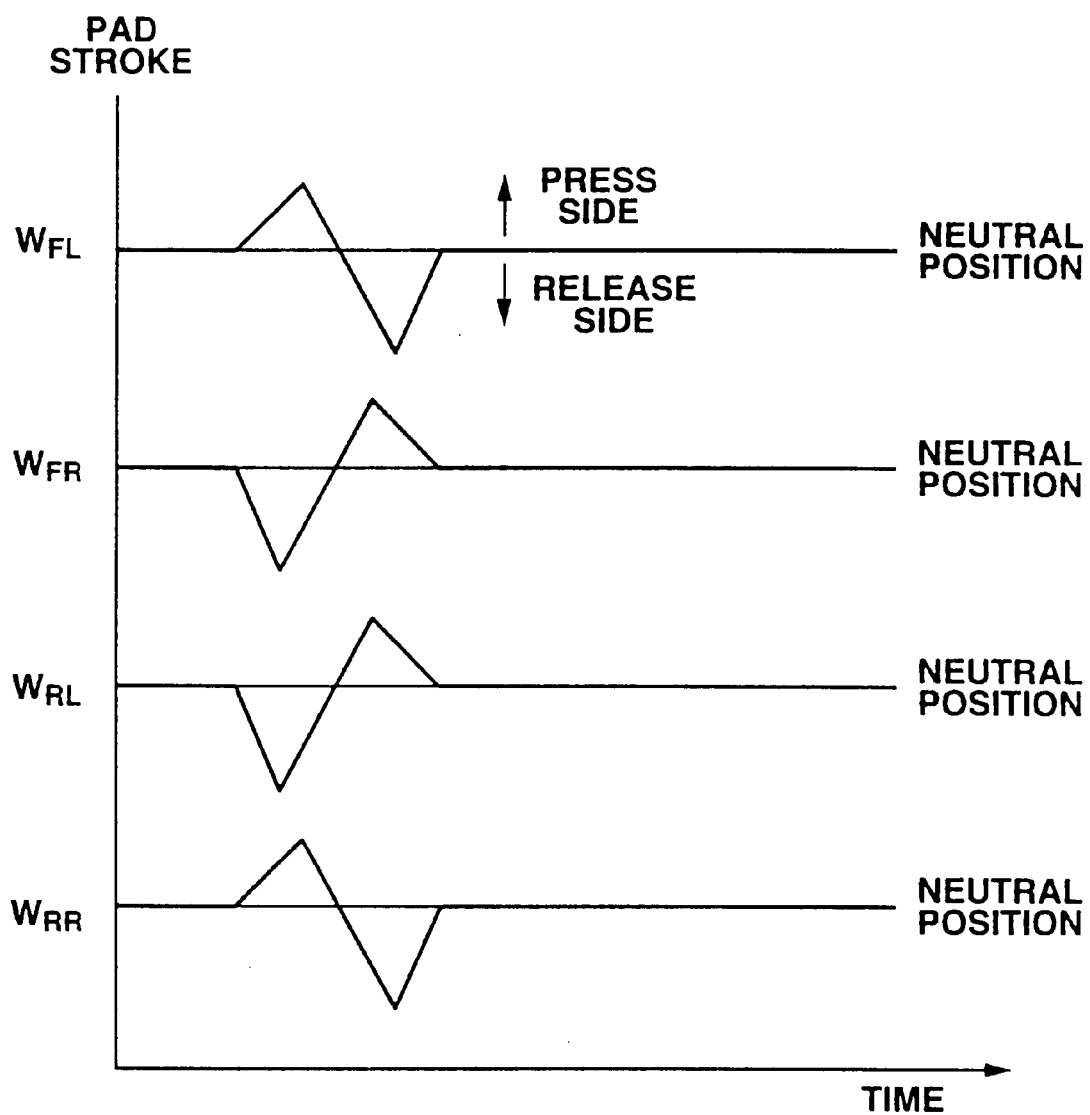
FIG. 10 is a time chart showing a modified operation of the operation pattern ①.

Although the embodiment according to the present invention has been shown and described such that in the operation pattern ①, first brake pad 6a of each brake actuator 15FL, 15FR, 15RL, 15RR is moved to the press side one by one in order to avoid consumed electric power from being temporally increased, it will be understood that the present invention is not limited to this arrangement. In the case that it is important that the pattern operation process is quickly executed, such movements toward the press side may be executed as shown in FIG. 10 such that the right wheel set and the left side wheel set are simultaneously moved, first brake pad 6a of one wheel of each wheel set is moved to the press side, and first brake pad 6a of the other wheel of each wheel set is moved to the release side.

Although the embodiment according to the present invention has been shown and described such that in case of the vehicle condition No. 6 or No. 8 in Table 1, the operation pattern ③ is selected, it will be understood that the operation pattern ② may be selected so as to move first brake pads 6a of the driving wheels toward the release side if a wheel speed sensor for detecting a rotation speed of a wheel is installed to each driving wheel and if first brake pads 6a of the driving wheels are controlled according to detection signals of the wheel speed sensors. More specifically, when first brake pads 6a of the driving wheels are moved to the release side and when the wheel speed sensors for the driving wheels do not detect the rotations of the driving wheels, brake pads 6a of the driving wheels are moved toward the release side apart from the neutral position by the predetermined quantity, then they are returned to the brake command position. When the wheel speed sensors for the driving wheels detects the rotation of the driving wheels, brake pads 6a of the driving wheels are stopped moving toward the release side and are moved to the press side to increase the braking force for preventing racings of the driving wheels.

While the embodiment according to the present invention has been shown and described such that the pattern operation process is executed when the ignition switch is turned on and when the number $B_N$ of braking operations becomes greater than the predetermined number $P_N$, it will be understood that the present invention is not limited to this and may be arranged such that the pattern operation process is executed when the ignition switch is turned on or when the number $B_N$ of braking operations becomes greater than the predetermined number $P_N$. It is preferable that the pattern operation process is executed when the number $B_N$ of braking operations becomes greater than the predetermined number $P_N$ since in the case that the vehicle is driven for a relatively long time after the turning on of the ignition switch until the vehicle is parked, there is a possibility that the lubrication of the brake system becomes insufficient.

Although the embodiment according to the present invention has been shown and described such that the pattern operation process is executed when the number $B_N$ of braking operations becomes greater than the predetermined number $P_N$, it will be understood that the present invention is not limited to this and may be arranged such that a predetermined travel distance $P_D$, at which the brake system requires lubrication, has been previously set on the basis of various experiments and the pattern operation process is executed when a travel distance $T_D$ of the vehicle becomes greater than the predetermined travel distance $P_D$ and when the vehicle is in the stopping state. This prevents the lubrication problem from being caused by vibrations inputted from a road surface.

Further, the timing for executing the pattern operation process may be decided on the basis of a predetermined travel time $P_T$ at which the brake system requires lubrication and has been previously set on the basis of various experiments. That is, the pattern operation process is executed when a travel time $T_T$ of the vehicle becomes greater than the predetermined travel time $P_T$ and when the vehicle is in the stopping state. This prevents the friction of the brake system from being varied by the aging of the oil films of the brake system.

Figure 11:
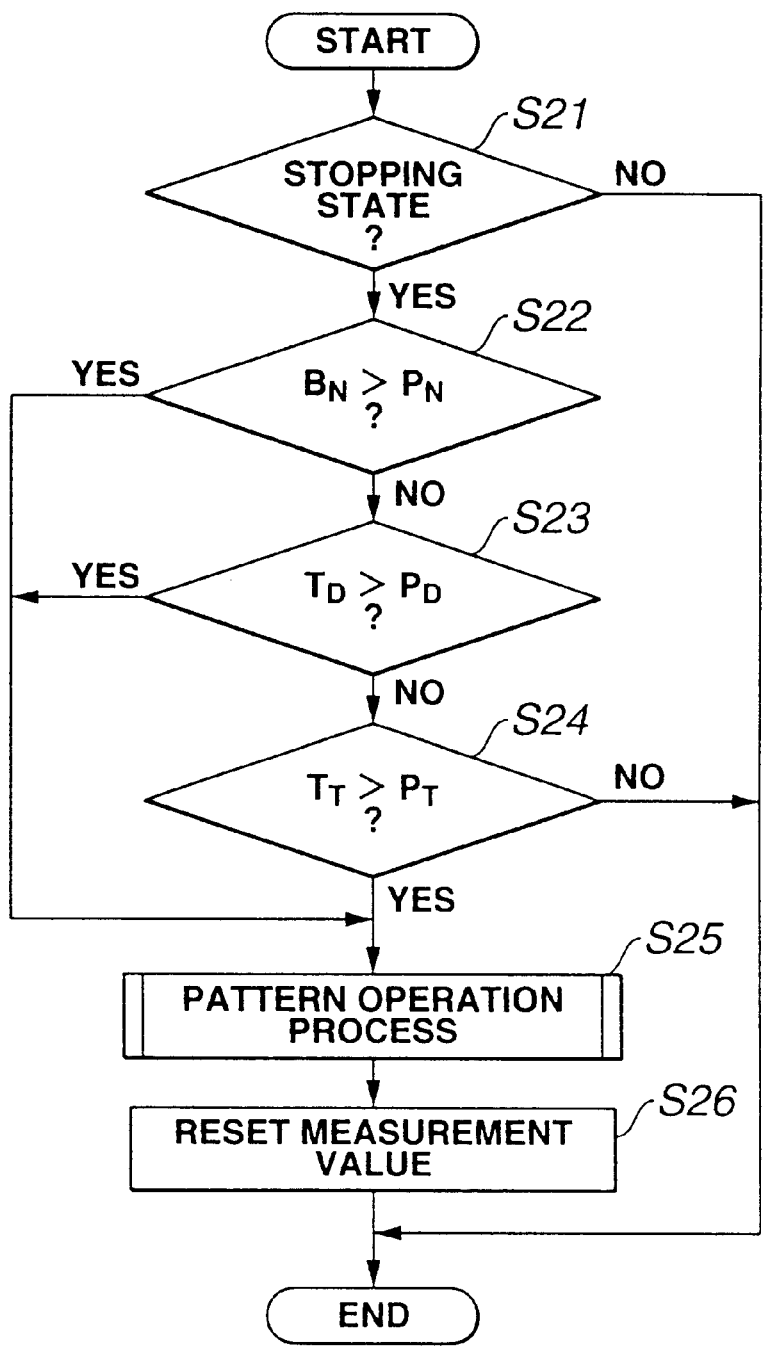
FIG. 11 is a flowchart showing a modified pattern operation execution control process.

Furthermore, the timing for executing the pattern operation process may be decided on the basis of the combination of the above-mentioned conditions as shown by a flowchart of FIG. 11. This prevents the friction change caused by the braking operation, the road input, the aging of the oil film.

More specifically, as shown in FIG. 11, at step S21, controller 20 decides whether or not the vehicle is in the stopping state. When it is decided that the vehicle is not in the stopping state, this routine is terminated and is returned to the main program. When it is decided that the vehicle is in the stopping state, the routine proceeds to step S22 wherein controller 20 decides whether or not the number $B_N$ of braking operations becomes greater than the predetermined number $P_N$. When it is decided at step S22 that the number $B_N$ of the braking operations is greater than the predetermined number $P_N$, the routine proceeds to step S25 wherein controller 20 executes the pattern operation process. When it is decided at step S22 that the number $B_N$ of the braking operations is smaller than or equal to the predetermined number $P_N$ of times, the routine proceeds to step S23.

At step S23, controller 20 decides whether or not the travel distance $T_D$ is greater than the predetermined distance $P_D$. When it is decided at step S23 that the travel distance $T_D$ is greater than the predetermined distance $P_D$, the routine proceeds to step S25 where controller 20 executes the pattern operation process. When it is decided at step S23 that the travel distance $T_D$ is smaller than or equal to the predetermined distance $P_D$, the routine proceeds to step S24 wherein controller 20 decides whether or not the travel time $T_T$ becomes greater than the predetermined travel time $P_T$. When it is decided at step S24 that the travel time $T_T$ is greater than the predetermined travel time $P_T$, the routine proceeds to step S25 wherein the pattern operation process is executed. When it is decided at step S24 that the travel time $T_T$ is smaller than or equal to the predetermined travel time $P_T$, the present routine is terminated and returns to the main program. After the execution of the pattern operation process at step S25, the routine proceeds to step S25 wherein controller 20 resets the number $B_N$ of braking operations, the travel distance $T_D$ and the travel time $T_T$. Thereafter, the routine is terminated and is returned to the main program.

With this arrangement, the pattern operation process is executed when the number $B_N$ of braking operations is greater than the predetermined number $P_N$, or when the travel distance $T_D$ is greater than the predetermined distance $P_D$, or when the travel time $T_T$ is greater than the predetermined travel time $P_T$. Accordingly, this arrangement prevents the friction change caused by the lubrication trouble by the braking operation, the road input or the aging of the oil film. Further, the pattern operation process may be executed again just after the ignition switch is turned off.

Although the embodiment according to the present invention has been shown and described to reproduce the oil films between screw shaft 5 and balls 4c of ball nut 4 by moving brake pads 6 to the release side in order to suppress the consumption of electric power for the lubricating operation, it will be understood that the oil films may be reproduced by moving brake pads 6a toward the press side if there is a great margin in consuming electric power.

While the embodiment according to the present invention has been shown and described to employ the ball screw mechanism as a rotational motion converting mechanism, it will be understood that the present invention is not so limited and may be arranged, for example, to employ a rack and pinion mechanism.

Although the embodiment according to the present invention has been shown and described to execute the pattern operation process when the shift position "D" is selected in Table 1, it will be understood that even when the shift position is selected at "1" or "2", the pattern operation process may be executed. Further, although the embodiment has been shown and described to be adapted to an automotive vehicle equipped with an automatic transmission, it will be understood that the present invention is not limited to this and may be adapted to an automotive vehicle equipped with a manual transmission. In the case of the manual transmission, the shift positions, where driving force of the engine is transmitted to driving wheels, may be set as "D" of an automatic transmission.

The entire contents of Japanese Patent Application No. 11-260961 filed on Sep. 14, 1999 in Japan are incorporated herein by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. An electromechanical brake system for a vehicle, comprising:

a brake actuator installed to each wheel of the vehicle, said brake actuator comprising a motor; a disc rotor integrally connected to each wheel of the vehicle, a pair of brake pads for clamping the disc rotor according to the operation of the motor, and a rotational motion converting mechanism for converting rotational motion of the motor into linear motion to move the brake pad relative to the disc rotor;

a brake pedal sensor that detects a depression quantity of a brake pedal of the vehicle; and a controller connected to said brake actuator and said brake pedal sensor, said controller driving the motor of said brake actuator within a braking operation range in which a braking force is generated according to the depression quantity of the brake pedal, and driving the motor over the brake operation range when the vehicle is put in a vehicle stop state.

2. An electromechanical brake system for a vehicle, comprising:

a brake actuator installed to each wheel of the vehicle, said brake actuator comprising a motor, a disc rotor-integrally connected to each wheel of the vehicle, a pair of brake pads for clamping the disc rotor according to an operation of the motor, and a rotational motion converting mechanism for converting rotational motion of the motor into linear motion to move the brake pad relative to the disc rotor;

a vehicle operating condition detector that detects an operating condition of the vehicle; and a controller connected to said brake actuator and said vehicle operating condition detector, said controller deciding a depressing quantity of a brake pedal on the basis of the vehicle operating condition detected by said vehicle operating condition detector, driving the motor of said brake actuator within a braking operation range in which a braking force is generated according to the depression quantity of the brake pedal, deciding whether the vehicle is put in a vehicle stop state on the basis of the vehicle operating condition, and driving the motor over the brake operation range to execute a lubricating operation of the rotational motion converting mechanism when it is decided that the vehicle is put in the vehicle stop state.

3. The electromechanical brake system as claimed in claim 2, wherein said vehicle operating condition detector detects a driving condition of the vehicle, and said controller moves each brake pad according to the driving condition so as to ensure the total of braking forces to be generated at the respective wheels.

4. The electromechanical brake system as claimed in claim 2, wherein said vehicle operating condition detector detects as to whether a driving force of an engine of the vehicle is transmitted to each wheel, as to the depression quantity of the brake pedal, and as to whether an accelerator pedal is depressed.

5. The electromechanical brake system as claimed in claim 4, wherein said brake actuator is not independent of a parking brake device in operation, and said vehicle operating condition detector detects as to whether the parking brake device is in operation.

6. The electromechanical brake system as claimed in claim 4, wherein the operation of the brake pads of driving wheels is limited to a press direction toward the disc rotors when said vehicle operating condition detector detects that the driving force of the engine is transmitted to the driving wheels.

7. The electromechanical brake system as claimed in claim 4, wherein said vehicle operating condition detector includes a rotation detector for detecting whether driving wheels are rotated, and the operation of the brake pads of driving wheels is limited to a press direction toward the disc rotors when the brake pads of the driving wheels are moved toward a release direction in that the brake pads are released from the disc rotor and when the rotation detector detects that the driving wheels are rotated.

8. The electromechanical brake system as claimed in claim 2, wherein said controller drives the motor over the brake operation range when an ignition switch of the vehicle is turned on.

9. The electromechanical brake system as claimed in claim 2, wherein said controller drives the motor over the brake operation range when an ignition switch of the vehicle is turned off.

10. The electromechanical brake system as claimed in claim 2, wherein said controller counts the number of braking operations and drives the motor over the brake operation range when the number of braking operations becomes greater than a predetermined number.

11. The electromechanical brake system as claimed in claim 2, wherein said controller measures a travel time of the vehicle on the basis of the vehicle operating condition and drives the motor over the brake operation range when the travel time becomes greater than a predetermined time.

12. The electromechanical brake system as claimed in claim 2, wherein said controller measures a travel distance of the vehicle on the basis of the vehicle operating condition and drives the motor over the brake operation range when the travel distance becomes greater than a predetermined distance.

13. An electromechanical brake system for a vehicle, comprising:

braking force actuating means for actuating a braking force of each wheel of the vehicle, said braking force actuating means comprising a motor, a disc rotor integrally connected to each wheel of the vehicle, a pair of brake pads for clamping the disc rotor according to the operation of the motor, and a rotational motion converting mechanism for converting rotational motion of the motor into linear motion to move the brake pad toward the disc rotor;

pedal depression quantity detecting means for detecting a depression quantity of a brake pedal;

braking force controlling means for controlling an operation of the motor so as to generate a braking force according to the depression quantity of the brake pedal;

vehicle stopping state detecting means for detecting whether the vehicle is in a vehicle stop state;

external-region operation controlling means for driving the motor over the brake operation range to execute a lubricating operation of the rotational motion converting mechanism when the vehicle is put in the vehicle stop state.

14. A method of controlling an electromechanical brake system for a vehicle, the brake system having a brake actuator installed to cach wheel of the vehicle, the brake actuator comprising a motor, a disc rotor integrally connected to each wheel of the vehicle, a pair of brake pads for clamping the disc rotor according to the operation of the motor, and a rotational motion converting mechanism for converting rotational motion of the motor into linear motion to move the brake pad toward the disc rotor, the method comprising:

detecting a depression quantity of a brake pedal;

controlling an operation of the motor so as to generate a braking force according to the depression quantity of the brake pedal;

detecting whether the vehicle is in a vehicle stop state; and driving the motor over the brake operation range to execute a lubricating operation of the rotational motion converting mechanism when the vehicle is put in the vehicle stop state.

15. An electromechanical brake system for a vehicle, comprising:

a brake actuator installed to each wheel of the vehicle, said brake actuator comprising a motor, a disc rotor integrally connected to each wheel of the vehicle, a pair of brake pads for clamping the disc rotor according to an operation of the motor, and a rotational motion converting mechanism for converting rotational motion of the motor into linear motion to move the brake pad relative to the disc rotor, tee rotational motion converting mechanism being constituted by a screw shaft which is integrally connected to a rotation shaft of the motor and a ball screw which is screwed with the screw shaft and is integrally connected to one of the pair of brake pads, a lubrication hole for supplying lubricant to the screw shaft being provided at a flange portion formed at an end portion of the ball nut nearer to the motor, a vehicle operating condition detector that detects an operating condition of the vehicle; and a controller connected to said brake actuator and said vehicle operating condition detector, said controller deciding whether the vehicle is put in a vehicle stop state on the basis of the vehicle operating condition, and driving the motor so that an ordinary use region of the screw shaft, which contacts with balls of the ball nut during a brake operation, is faced with the lubrication hole when said controller decides based on the vehicle operating condition that the vehicle is put in the vehicle stop state.

* * * * *